United States Patent [19]

Strepparola et al.

[11] Patent Number: 4,681,925
[45] Date of Patent: Jul. 21, 1987

[54] FLUORINATED POLYACRYLATES AND POLYACRYLAMIDES HAVING A CONTROLLED CROSS-LINKING DEGREE, AND PROCESS FOR PREPARING SAME

[75] Inventors: Ezio Strepparola, Treviglio; Alberto Re, Milan, both of Italy

[73] Assignee: Ausimont S.p.A., Milan, Italy

[21] Appl. No.: 831,617

[22] Filed: Feb. 21, 1986

[30] Foreign Application Priority Data

Feb. 22, 1985 [IT] Italy ............................... 19629 A/85

[51] Int. Cl.$^4$ .............................................. C08F 14/18
[52] U.S. Cl. ................... 526/246; 526/247; 428/421; 428/694; 428/900
[58] Field of Search ................... 526/246, 247

[56] References Cited

U.S. PATENT DOCUMENTS

| | | | |
|---|---|---|---|
| 3,544,537 | 12/1970 | Brace | 526/246 |
| 4,529,783 | 7/1985 | Tsunoda | 526/246 |
| 4,569,962 | 2/1986 | Burguette | 526/246 |

*Primary Examiner*—Paul R. Michl
*Attorney, Agent, or Firm*—Stevens, Davis, Miller & Mosher

[57] ABSTRACT

This invention relates to the preparation of new fluorinated polymers starting from acrylic esters and/or acrylamides, in which the cross-linking degree of the final product is controlled by using, as a starting product, a mixture of mono- and di-acryl monomers, said monomers being characterized in that they include in their structure a perfluoropolyoxyalkylene chain.

4 Claims, No Drawings

FLUORINATED POLYACRYLATES AND POLYACRYLAMIDES HAVING A CONTROLLED CROSS-LINKING DEGREE, AND PROCESS FOR PREPARING SAME

BACKGROUND OF THE INVENTION

It is known how to prepare fluorinated acrylic polymers starting from monomers of the acrylic ester or acrylamide type containing only one acryl group and characterized by containing perfluoropolyoxyalkylene chains in their structure. Products of this type are described for example in U.S. Pat. No. 3,814,741. From U.S. Pat. No. 3,810,874 there are also known polymers obtained from monomers consisting of a perfluoropolyoxyalkylene chain containing two acrylic groups.

The polymers of the first type are soluble products with a non-crosslinked structure, while the ones of the second type are products which, due to the excessive cross-linking degree, exhibit a too high modulus of elasticity and a too low elongation at break for a considerable number of uses.

THE PRESENT INVENTION

Thus, it is the object of the present invention to prepare new fluorinated polymers of the type of the polyacrylate and polyacrylamides, having a controlled cross-linking degree and obtained from a monomer mixture comprising:

(a) from 1 to 99% by moles of a monomer of the monoacrylate or monoacrylamide type, consisting of a perfluoropolyoxyalkylene chain and having one of the following general formulas:

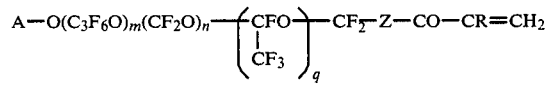
(a.1)

wherein:
m, n and q are integers from 0 to 50, and m+n+q is not lower than 2, the oxyfluoroalkylene units being statistically distributed along the chain;
A is perfluoroalkyl end groups of the type $CF_3-$, $CF_3-O-CF(CF_3)-$, $C_3F_7-$;
Z is $-CX(Y)O-(CH_2-CH_2O)_p-$ or $-CH_2NR'-$;
X is a hydrogen atom or a fluorine atom;
Y is $CF_3$ or it may be also H if also X is H;
R and R', like or different from each other, may be H or $CH_3$;
p=0–3;

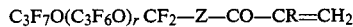
(a.2)

wherein Z and R have the above defined meanings and r is an integer of at least 2;

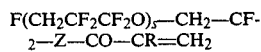
(a.3)

wherein s is an integer comprised between 1 and 50 and Z and R have the meanings above defined.

(b) from 99% to 1% by moles of a monomer of the diacrylate or diacrylamide type, consisting of a perfluoropolyoxyalkylene chain and having one of the following general formulas:

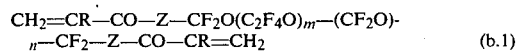
(b.1)

in which the units of $-C_2F_4O-$ and $-CF_2O-$ are statistically distributed along the chain, Z and R being the same as defined hereinbefore, and m and n being integers from 1 to 50;

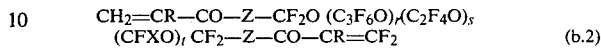
(b.2)

wherein r, s and t are integers from 1 to 50 and Z and R have the meanings as above defined;

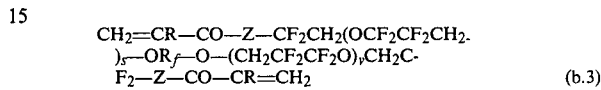
(b.3)

wherein s and v are integers from 1 to 50 and Z and R have the meanings as above defined, $R'_f$ being a perfluoroalkylene radical of 1-6 carbon atoms.

The perfluoropolyoxyalkyl-derivatives of the above classes (a) and (b) can be prepared as described in the U.S. Pat. Nos. 3,810,174, 3,814,741, 3,242,218, 3,847,978, 3,665,041, and in EP No. 148,482.

Other suitable compounds of class (b), described in EP No. 151,877, contain repeating units ($C_3F_6$) tied together through a $-CF_2-(R_f)_x-CF_2O$, X=0, or 1, $R_f$ is a fluoroalkylenic group.

The cross-linking degree of the resulting polymer will vary, of course, as a function of the ratio between the two comonomers (a) and (b) of the starting mixture.

Furthermore, depending on the characteristics to be obtained for the final polymer, it is possible to vary the molecular weights of the starting comonomers of type (a) and (b) independently of each other.

The resulting polymers are elastomeric and exhibit an aggregate of interesting properties. They are very flexible at low temperatures, even below −80° C., and possess an excellent resistance to thermal degradation, also in the presence of air, at temperatures up to 250° C., excellent oil- and water-repellent properties as well as a very high resistance to the action of mineral oils and of vegetal oils; they are practically insoluble in all the common organic solvents and exibit a high resistance to the oxidizing agents and excellent surface physical properties which result in extremely low values of the critical surface tension and of the wettability of the films prepared therefrom. The polymers of the present invention are particularly suitable for imparting a high resistance to soiling and to water absorption to the fabrics. Generally, the fabric is treated according to impregnation methods known by themselves, namely by immersion into a solution of monomers in a proper solvent and by drying of the manufactured article or by spreading of said monomers, depending on the layer's final thickness to be obtained. Such treatment is followed by a polymerization step according to known methods. The fabrics so treated not only exhibit a high starting resistance to the absorption of water, but retain such resistance also after repeated washings.

The acrylic or methacrylic esters can be prepared from the corresponding alcohols with acryl or methacryl acid or derivatives thereof. Examples of alcohols useful to prepare the monomers of type (a) are:

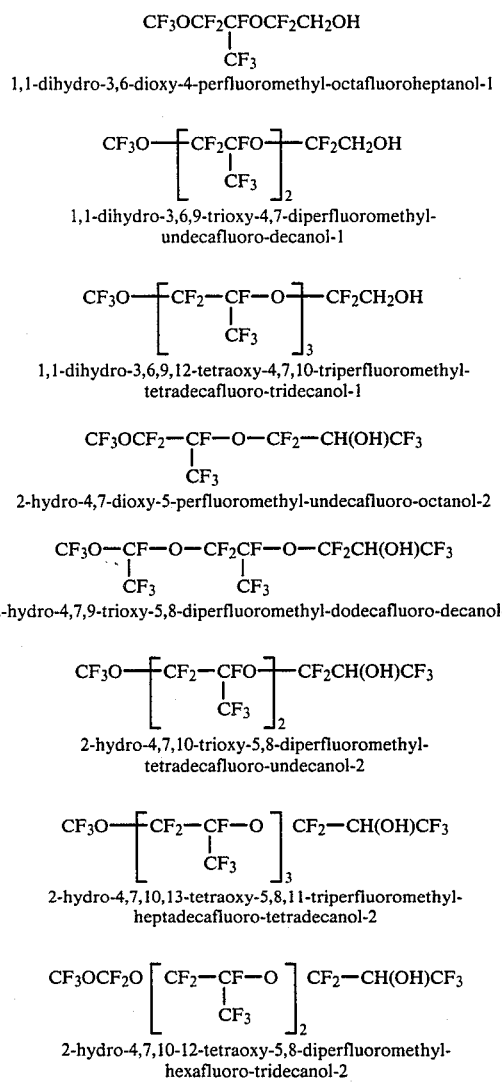

CF₃OCF₂OCF₂CH₂OH
1,1-dihydro-3,5-dioxy-heptafluoro-hexanol-1
CF₃O(CF₂O)₂—CF₂CH₂OH
1,1-dihydro-3,5,7-trioxy-nonafluoro-octanol-1
CF₃O(CF₂O)₃—CF₂CH₂OH
1,1-dihydro-3,5,7,9-tetraoxy-undecafluoro-decanol-1
CF₃O(CF₂O)₄—CF₂CH₂OH
1,1-dihydro-3,5,7,9,11-pentaoxy-tridecafluoro-dodecanol-1,
and also mixtures thereof.

The acrylic and methacrylic esters of the abovesaid primary and secondary alcohols are preparable by means of any conventional method: see for example R.B Wagner and H.D. Zook in Synthetic Organic Chemistry, ed. J. Wiley, N.Y., page 479 (1956).

In particular, it is possible to directly esterify the alcohol with the acrylic or methacrylic acid in the presence of catalysts of the strong acid type such as H₂SO₄,HCl, in amounts equal to 0.01% up to 5% by weight. It is also possible to proceed by gradually removing the water that forms during the reaction by means of azeotropic distillation for example in the presence of benzene, toluene.

It is also possible to carry out the esterification by reacting the alcohol with the chloride of the acid, optionally in the presence of a base, in order to neutralize HCl which is formed.

At last, it is possible to prepare the esters by transesterification of methylacrylate or of methylmethacrylate with the starting fluorinated alcohol, optionally by operating in the presence of transesterification catalysts.

The fluorinated alcohols can be prepared according to the processes indicated in U.S. Pat. No. 3,814,741.

The acrylic and methacrylic diesters of group (b) can be prepared from corresponding diols according to methods similar to those mentioned hereinbefore for the monoesters.

Examples of fluorinated diols which are suited to the synthesis of monomers of type (b) are the ones of general formula:

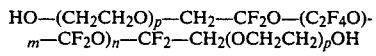

wherein:
p ranges from 0 to 3;
m and n are integers from 1 to 50;
units —C₂F₄O— and —CF₂O— are statistically distributed along the chain.

The acrylamides and methacylamides of the present invention are preparable through a series of reactions starting from corresponding esters or chlorides of the perfluoropolyoxyalkyl acids according to what is described in U.S. Pat. No. 3,814,741.

The diacrylamides and dimethacrylamides of the present invention can be prepared through analogous series of reactions starting from the corresponding esters or chlorides of the diacids.

The polyacrylates and the polyacrylamides forming the object of the present invention can be prepared starting from the mixture of monomers by radicalic bulk polymerization or in the presence of solvents. Suitable radicalic starters are for example azo-bisisobutyronitrile, benzoylperoxide, di-ter-butylperoxide, borotrialkyls with oxygen.

Furthermore, polymerization can be advantageously carried out according to photochemical methods, such as U.V. radiations, or by bombardment with an high-energy electron beam.

Abovesaid methods are particularly advantageous for the use of the polymers of the invention as protective layers on various substrates.

In fact it is possible to apply the mixture of the reactive monomers, either as such or diluted with solvents, to any substrate, and then to subject it to radiation until a film has formed.

In the case of U.V. radiation it is possible to add a photo-starter in order to reduce the time necessary for the formation of the polymeric film. As photo-starters there may be cited ketone derivatives such as, for example, benzophenone, the benzoin alkylethers and the α,α-dialkoxyethers of acetophenone and of α-phenylacetophenone.

If it is operated according to the EB (electron beam) technique, the starter is not necessary in consequence of the high energy of the electron beam, and by operating at sufficiently high MRads levels, the film can be obtained in a few seconds.

The properties of the polymers conforming to the present invention are substantially determined by the presence in their chain of side perfluoropolyoxyalkylene chains.

In particular they are characterized by a good flexibility at low temperatures.

The presence of perfluorinated chains imparts to the materials, besides an excellent thermooxidation resistance, also oil- and water-repellent characteristics, said properties being highly appreciated in the protective coatings.

The polymers of the present invention show in particular very low values of refraction index, of surface energy and of wettability, and furthermore it is possible to obtain fully transparent materials, apart from the ratio of the two components (a) and (b).

These characteristics do not occur in the similar products in which the cross-linking degree is controlled through the use of comonomers of the type non fluorinated mono- or di-acrylic compounds.

The polyacrylates and the polyamides of the present invention are utilizable as protective coatings endowed with flowability properties on magnetic recording means (discs, tapes), which, therefore, exhibit a high abrasion resistance and a much longer life, as well as on organic or inorganic optical fibers.

Furthermore they can be used as protective coatings against atmospherical agents for electronic circuits and for optical-memory recording discs.

The following examples are given to illustrate the present invention and are not to be considered as limitative of the possible embodiments thereof.

EXAMPLE 1

To a solution of 49.8 g (0.1 mole) of 1,1-dihydro-3,6,9-trioxy-4,7-diperfluoromethyl-undecafluorodecanol-1 (prepared by reduction with LiAlH$_4$ of the corresponding acid) in 1,1,2-trichloro-1,2,2-trifluoroethane there were added dropwise 10.9 g (0.12 moles) of distilled acryloyl chloride.

12.1 g (0.12 moles) of triethylamine were subsequently added, whereafter a white precipitate was obtained. The reaction was carried out at 35° C. during 3 hours; the amine hydrochloride was then filtered and the solution was washed with iced water. After drying with Na$_2$SO$_4$ and removal of the solvent, the rough product was distilled under vacuum at 60°-63° C./0.2 mm of Hg, thus obtaining 49.7 g (yield=90%) of

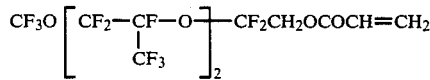

whose structure was identified by elemental analysis and by NMR analysis.

EXAMPLE 2

To a solution in 1,1,2-trichloro-1,2,2-trifluoroethane of 40 g (0.1 mole) of polyoxyperfluoroalkylene with di-hydroxymethyl end groups, of formula

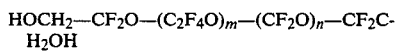

having an average molecular weight equal to 400 there were added dropwise 24.1 g (0.25 moles) of purified acryloyl chloride, maintaining the solution at room temperature. Subsequently there were added 24.1 g (0.25 moles) of triethylamine and, after 5 hours at 35° C., the hydrochloride was filtered, washing was carried out with ice water, the solution was anhydrified and the solvent was evaporated at reduced pressure. A colorless liquid was obtained, which was distilled to obtain the diacrylate (boiling point=100°-110° C. at 0.1 mm Hg), whose structure was identified by NMR and IR analyses. The yield was equal to 80%.

EXAMPLE 3

A mixture of 38.6 g (0.07 moles) of the acrylic ester prepared in example 1 and 15.2 g (0.03 moles) of the diacrylate obtained in example 2 was polymerized in the presence of benzoylperoxide (0.2 g) at 80° C. during 12 hours. The polymer was a transparent elastomer insoluble in 1,1,2-trichloro-1,2,2-trifluoroethane and in the common organic solvents, and was characterized by a glass transition temperature of −95° C.

EXAMPLE 4

A solution at 1% by weight in 1,1,2-trichloro-1,2,2-trifluoroethane of the monomers mixture of the preceding example was laid onto a glass plate and the solvent was evaporated; a uniform, about 30 nm thick layer was thus obtained. The plate was successively exposed to a bombardment with a high-energy electron beam, in a nitrogen atmosphere, in an EB processor (dose=3 MRads, 150 KV, velocity: 30 m/min:, oxygen 200 ppm).

A transparent and uniform film was obtained, on whose surface there was measured the contact angle for a few pure liquids of the n-alkane series having a known surface tension, such as hexadecane and heptane. From such angles, the surface tension value $\gamma_{sd}=\gamma_c=13$ (dynes/cm), defined as critical surface tension, was calculated by the Fowkes method (see F.M. Fowkes in "Contact Angle, Wettability and Adhesion" Adv. Chem. series 43, A.C.S. Washington 1964, page 99, where $\gamma_c$ was defined as critical wettability surface tension and $\gamma_{sd}$ as solid substrate surface tension caused by the London dispersion forces).

What is claimed is:

1. Acrylic or methacrylic polymers, having a controlled cross-linking degree, prepared by radicalic polymerization of a monomer mixture comprising:
   (a) from 1% to 99% by moles of a monomer of the monoacrylate or monoacrylamide type, consisting of a perfluoropolyoxyalkylene chain and having one of the following general formulas:

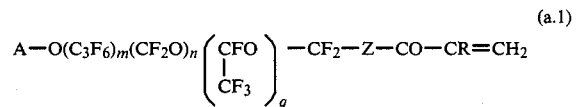

wherein:
   m, n and q are integers from 0 to 50, and m+n+q is not lower than 2, the oxyfluororalkylene unites being statistically distributed along the chain;
   A is a perfluoroalkyl end groups of the type

Z is —CX(Y)O—(CH$_2$—CH$_2$O)$_p$— or —CH$_2$N-R′—;
   X is a hydrogen atom or a fluorine atom;
   Y is CF$_3$ or it may be also H if also X is H;
   R and R′, like or different from each other, may be H or CH$_3$;
   p=0-3;

$$C_3F_7O(C_3F_6O)_rCF_2-Z-CO-CR=CH_2 \quad (a.2)$$

wherein Z and R have the above defined meanings and r is an integer of at least 2;

$$F(CH_2CF_2CF_2O)_sCH_2CF_2-Z-CO-CR=CH_2 \quad (a.3)$$

wherein s is an integer comprised between 1 and 50 and Z and R have the meanings above defined;

(b) from 99% to 1% by moles of a monomer of the diacrylate or diacrylamide type, consisting of a perfluoropolyoxyalkylene chain and having one of the following formulas:

$$CH_2=CR-CO-Z-CF_2O(C_2F_4O)_m-(CF_2O)_n-CF_2-Z-CO-CR=CH_2 \quad (b.1)$$

in which the units $-C_2F_4O-$ and $-CF_2O-$ are statistically distributed along the chain, Z and R being the same as defined hereinbefore, and m and n being integers from 1 to 50;

$$CH_2=CR-CO-Z-CF_2O(C_3F_6O)_r(C_2F_4O)_s(CFXO)_tCF_2-Z-CO-CR=CF_2 \quad (b.2)$$

wherein r, s and t are integers from 1 to 50 and Z and R have the meanings as above defined:

$$CH_2=CR-CO-Z-CF_2CH_2(OCF_2CF_2CH_2)_s-OR'_f-O-(CH_2CF_2CF_2O)_vCH_2CF_2-Z-CO-CR=CH_2 \quad (b.3)$$

wherein s and v are integers from 1 to 50 and Z and R have the meanings as above defined, $R'_f$ being a perfluoroalkylene radical of 1-6 carbon atoms.

2. The process for preparing fabrics having water-, oil-repellent and anti-staining properties, characterized in that the fabrics are treated with an acrylic monomer mixture of (a) and (b) of claim 1, which mixture is then polymerized in situ through application of U.V. radical energy or a high-energy electron beam.

3. The process for preparing protective layers on magnetic tapes and discs, characterized in that said tapes and discs are treated with an acrylic monomer mixture of (a) and (b) of claim 1, which mixture is then polymerized in situ by the application of U.V. radical energy or a high-energy electron beam.

4. Manufactured articles including protective film or layers formed by the acrylic and methacrylic polymers according to claim 1.

* * * * *